US011532093B2

(12) United States Patent
Mantey et al.

(10) Patent No.: US 11,532,093 B2
(45) Date of Patent: Dec. 20, 2022

(54) FIRST FLOOR HEIGHT ESTIMATION FROM OPTICAL IMAGES

(71) Applicant: Intermap Technologies, Inc., Englewood, CO (US)

(72) Inventors: Victoria Mantey, Calgary (CA); Ivan Maddox, Denver, CO (US); Michael Wollersheim, Foothills (CA); Stephen Griffiths, Calgary (CA)

(73) Assignee: Intermap Technologies, Inc., Englewood, CO (US)

( * ) Notice: Subject to any disclaimer, the term of this patent is extended or adjusted under 35 U.S.C. 154(b) by 161 days.

(21) Appl. No.: 17/068,214

(22) Filed: Oct. 12, 2020

(65) Prior Publication Data

US 2021/0110564 A1    Apr. 15, 2021

Related U.S. Application Data

(60) Provisional application No. 62/913,631, filed on Oct. 10, 2019.

(51) Int. Cl.
  *G06T 7/62*  (2017.01)
  *G06T 3/40*  (2006.01)
  (Continued)

(52) U.S. Cl.
  CPC ............. *G06T 7/62* (2017.01); *G06T 3/40* (2013.01); *G06T 7/10* (2017.01); *G06T 7/70* (2017.01);
  (Continued)

(58) Field of Classification Search
  CPC .... G06T 7/62; G06T 3/40; G06T 7/10; G06T 7/70; G06T 2207/10032;
  (Continued)

(56) References Cited

U.S. PATENT DOCUMENTS

| 5,109,430 A | 4/1992 | Nishihara |
| 5,187,754 A | 2/1993 | Currin |

(Continued)

FOREIGN PATENT DOCUMENTS

| WO | WO2008034465 A1 | 3/2008 |
| WO | WO2010056643 A2 | 5/2010 |

OTHER PUBLICATIONS

Snavley, N. (n.d.). Modeling the World from Internet Photo Collections. CSE576: Computer vision. Retrieved Jul. 29, 2022, from https://courses.cs.washington.edu/courses/cse576/ -2008 (Year: 2008).*

(Continued)

*Primary Examiner* — Amandeep Saini
(74) *Attorney, Agent, or Firm* — Perkins Coie LLP

(57) ABSTRACT

Systems and methods of automating the generation of an estimate of the first floor elevation of a building, using a Digital Terrain Model (DTM) and an image of the front of the building. First, machine learning (ML) algorithms are used to estimate the height of the first floor of the building above ground from the image. The estimated height is added to a DTM height of the geographical area corresponding to the location of the building to provide an estimate of the FFE. The disclosed embodiments can be applied in estimating the first floor height of any kind of building. For example, single-family homes, townhomes, high rise buildings, stores, malls, shops, movie theaters, or any other building. Additionally, the disclosed embodiments are camera-agnostic and can be applied on any type of image collected by any type of camera.

20 Claims, 12 Drawing Sheets

(51) Int. Cl.
  *G06T 7/10* (2017.01)
  *G06T 7/70* (2017.01)
(52) U.S. Cl.
  CPC .............. *G06T 2207/10032* (2013.01); *G06T 2207/30181* (2013.01)
(58) Field of Classification Search
  CPC . G06T 2207/30181; G06T 2207/20084; G06T 7/11; G06T 7/60
  USPC ........................................................ 382/103
  See application file for complete search history.

(56) References Cited

U.S. PATENT DOCUMENTS

| | | |
|---|---|---|
| 5,926,581 A | 7/1999 | Pritt |
| 6,272,448 B1 | 8/2001 | Ishii |
| 6,448,544 B1 | 9/2002 | Stanton |
| 6,757,445 B1 | 6/2004 | Knopp |
| 6,792,684 B1 | 9/2004 | Hyyppa |
| 6,937,775 B2 | 8/2005 | Gindele |
| 6,973,218 B2 | 12/2005 | Alderson |
| 6,978,050 B2 | 12/2005 | Hunter |
| 7,013,235 B2 | 3/2006 | Hyyppa |
| 7,043,090 B2 | 5/2006 | Gindele |
| 7,116,838 B2 | 10/2006 | Gindele |
| 7,187,452 B2 | 3/2007 | Jupp |
| 7,236,649 B2 | 6/2007 | Fenney |
| 7,386,164 B2 | 6/2008 | Shragai |
| 7,627,491 B2 | 12/2009 | Feyen |
| 7,639,842 B2 | 12/2009 | Kelle |
| 7,856,312 B2 | 12/2010 | Coombes |
| 7,881,913 B2 | 2/2011 | O'Neil |
| 7,917,292 B1 | 3/2011 | Du |
| 7,917,346 B2 | 3/2011 | Sullivan |
| 8,010,294 B2 | 8/2011 | Dorn |
| 8,139,111 B2 | 3/2012 | Oldroyd |
| 8,208,689 B2 | 6/2012 | Savolainen et al. |
| 8,239,179 B2 | 8/2012 | Duncan |
| 8,295,554 B2 | 10/2012 | Francini et al. |
| 8,369,579 B2 | 2/2013 | Barnes |
| 8,473,264 B2 | 6/2013 | Frigerio |
| 8,543,430 B1 | 9/2013 | Fields et al. |
| 8,615,362 B2 | 12/2013 | Laake |
| 8,655,595 B1 | 2/2014 | Green et al. |
| 8,718,393 B2 | 5/2014 | Chen |
| 8,825,456 B2 | 9/2014 | Vasudevan |
| 8,855,439 B2 | 10/2014 | Louis |
| 8,874,187 B2 | 10/2014 | Thomson |
| 9,147,285 B2 | 9/2015 | Kunath |
| 9,245,196 B2 | 1/2016 | Marks |
| 9,299,191 B2 | 3/2016 | Sinram et al. |
| 9,418,475 B2 | 8/2016 | Medioni |
| 9,436,987 B2 | 9/2016 | Ding |
| 9,589,362 B2 | 3/2017 | Sarkis |
| 9,830,690 B2 | 11/2017 | Chiang |
| 9,866,815 B2 | 1/2018 | Vrcelj |
| 9,875,554 B2 | 1/2018 | Imber |
| 9,904,867 B2 | 2/2018 | Fathi |
| 9,911,242 B2 | 3/2018 | Sundaresan |
| 9,912,862 B2 | 3/2018 | Peruch |
| 10,002,407 B1 | 6/2018 | Mercer |
| 10,078,913 B2 | 9/2018 | Rondao |
| 10,147,057 B2 | 12/2018 | Zhang |
| 10,186,015 B1 | 1/2019 | Mercer |
| 10,204,454 B2 | 2/2019 | Goldman et al. |
| 10,304,203 B2 | 5/2019 | Forutanpour |
| 10,325,349 B2 | 6/2019 | Mercer et al. |
| 10,354,411 B2 | 7/2019 | Fu |
| 10,430,641 B2 | 10/2019 | Gao |
| 10,452,789 B2 | 10/2019 | Madmony |
| 10,579,875 B2 | 3/2020 | Dal Mutto |
| 10,636,209 B1 | 4/2020 | Thaller et al. |
| 10,636,219 B2 | 4/2020 | Steinbrucker |
| 10,699,421 B1 | 6/2020 | Cherevatsky |
| 10,733,798 B2 | 8/2020 | Wagner |
| 10,817,752 B2 | 10/2020 | Kehl |
| 10,825,217 B2 | 11/2020 | Ulusoy |
| 10,930,074 B2 | 2/2021 | Fu |
| 10,937,178 B1 | 3/2021 | Srinivasan |
| 10,937,188 B2 | 3/2021 | Malisiewicz |
| 10,970,518 B1 | 4/2021 | Zhou |
| 11,244,189 B2 | 2/2022 | Fathi |
| 2003/0138152 A1 | 7/2003 | Fennye |
| 2004/0260471 A1 | 12/2004 | McDermott |
| 2008/0260237 A1 | 10/2008 | Savolainen et al. |
| 2010/0292973 A1 | 11/2010 | Barnes |
| 2011/0246935 A1 | 10/2011 | Maeder |
| 2011/0295575 A1 | 12/2011 | Levine et al. |
| 2012/0330553 A1 | 12/2012 | Mollaei |
| 2013/0046471 A1 | 2/2013 | Rahmes |
| 2013/0155109 A1 | 6/2013 | Schultz et al. |
| 2013/0197807 A1 | 8/2013 | Du |
| 2013/0342736 A1 | 12/2013 | Numata |
| 2014/0267250 A1 | 9/2014 | Tennant |
| 2014/0301633 A1 | 10/2014 | Furukawa et al. |
| 2015/0046139 A1 | 2/2015 | Iwamura |
| 2015/0154805 A1 | 6/2015 | Hsu |
| 2016/0148347 A1 | 5/2016 | Guido |
| 2016/0196659 A1 | 7/2016 | Vrcelj |
| 2016/0239924 A1 | 8/2016 | Fields et al. |
| 2016/0366348 A1* | 12/2016 | Dixon .................... H04N 7/188 |
| 2017/0154127 A1 | 6/2017 | Madmony |
| 2017/0358067 A1 | 12/2017 | Jung |
| 2018/0165616 A1 | 6/2018 | Sun et al. |
| 2019/0108396 A1 | 4/2019 | Dal Mutto |
| 2019/0213389 A1 | 7/2019 | Peruch |
| 2019/0259202 A1 | 8/2019 | Taubin |
| 2020/0134733 A1 | 4/2020 | Maddox |
| 2020/0320327 A1 | 10/2020 | Fathi |
| 2020/0348132 A1 | 11/2020 | Du et al. |
| 2021/0118224 A1 | 4/2021 | Zhan |

OTHER PUBLICATIONS

Final Office Action in U.S. Appl. No. 16/664,696, dated Jan. 24, 2022, 33 pages.
International Search Report and Written Opinion dated Jan. 24, 2022 in International Patent Application No. PCT/US21/54498, 11 pages.
Non-Final Office Action in U.S. Appl. No. 16/664,696, dated Sep. 20, 2021, 26 pages.
Krizhevsky, A. et al., "ImageNet Classification with Deep Convolutional Neural Networks." Jun. 2017, 9 pages.
Non-Final Office Action in U.S. Appl. No. 14/825,806, dated Dec. 1, 2017, 13 pages.
Non-Final Office Action in U.S. Appl. No. 15/963,937, dated May 31, 2018, 10 pages.
Non-Final Office Action in U.S. Appl. No. 16/398,027, dated Aug. 6, 2019, 8 pages.
Notice of Allowance in U.S. Appl. No. 14/825,806, dated Jul. 11, 2018, 12 pages.
Notice of Allowance in U.S. Appl. No. 14/825,806, dated Sep. 4, 2018, 11 pages.
Notice of Allowance in U.S. Appl. No. 15/723,154, dated Jan. 26, 2018, 9 pages.
Notice of Allowance in U.S. Appl. No. 15/963,937, dated Sep. 19, 2018, 8 pages.
Notice of Allowance in U.S. Appl. No. 16/221,859, dated Jan. 29, 2019, 10 pages.
Notice of Allowance in U.S. Appl. No. 16/398,027, dated Sep. 24, 2019, 7 pages.
Notice of Allowance in U.S. Appl. No. 17/193,277, dated Sep. 8, 2022, 10 pages.

* cited by examiner

FIRST FLOOR HEIGHT ESTIMATION FROM OPTICAL IMAGES

CROSS-REFERENCE TO RELATED APPLICATION(S)

This application claims the benefit of U.S. Provisional Application No. 62/913,631, filed on Oct. 10, 2019, which is hereby incorporated by reference in its entirety.

TECHNICAL FIELD

This disclosure is related to computer-implemented detection of physical layout elements of an architectural structure. More particularly, the embodiments disclosed herein are directed at estimating a first floor height of an architectural structure for location-based applications and analyses.

BACKGROUND

First floor elevation of an architectural structure is important for the insurance industry to evaluate the risk of property damage in the event of flooding. For example, the lower the first floor elevation of a building relative to a ground level, the higher is the risk of flooding. The potential cost of damages in a flood event increases when flood waters reach the occupied levels of a home. Flooding in the first floor not only causes damage to the structure itself, but also the possessions on the first floor. The additional value of these assets, in addition to cost of repairs to the structure, is factored into the insurance assessment of flood risk. The conventional standard is to have a land surveyor physically establish first floor elevation. The surveyor assesses flood risk by physically measuring the height of the first floor from the ground level. However, this is cumbersome, time-consuming, prone to human error, and expensive. This can be further challenging when the number of buildings (whose flood risks are to be assessed) in a geographical area are in the millions or hundreds of millions.

DETAILED DESCRIPTION

1. Introduction

Embodiments of the present disclosure are directed at computationally generating an estimate of the first floor elevation (FFE) of a building using a Digital Terrain Model (DTM) and an image (e.g., showing the front) of the building. First, machine learning (ML) algorithms are used to segment the image of the building to identify doorways, stairs, garage doors, building extents, and other physical layout elements. Information relating to the physical layout elements is used to generate an estimate of the height of the first floor of the building above ground. The estimated height is added to a DTM height at the same location to provide an estimate of the FFE. One patentable benefit of the disclosed technology is that the estimate of the first floor height generated using the techniques disclosed herein corresponds to a true, first-floor height of the building. For example, the estimate of the first floor height of a building can be applied in real-world use cases as a substitute for the true, first-floor height of the building. The disclosed embodiments can be applied in estimating the first floor height of any kind of building. For example, single-family homes, townhomes, high rise buildings, stores, malls, shops, movie theaters, or any other architectural structure.

2. Terminology

The following definitions are provided for ease in understanding the concepts discussed herein.

Datum: Reference surface defining the mean sea level, e.g., zero elevation.

Digital Terrain Model (DTM): Height of terrain above the datum (coincident with the building grade).

First Floor Height (FFH): Height of the first floor of a structure above the terrain (DTM height).

First Floor Elevation (FFE): Height of the first floor above the datum. Sum of the DTM height and FFH.

Figure 1:
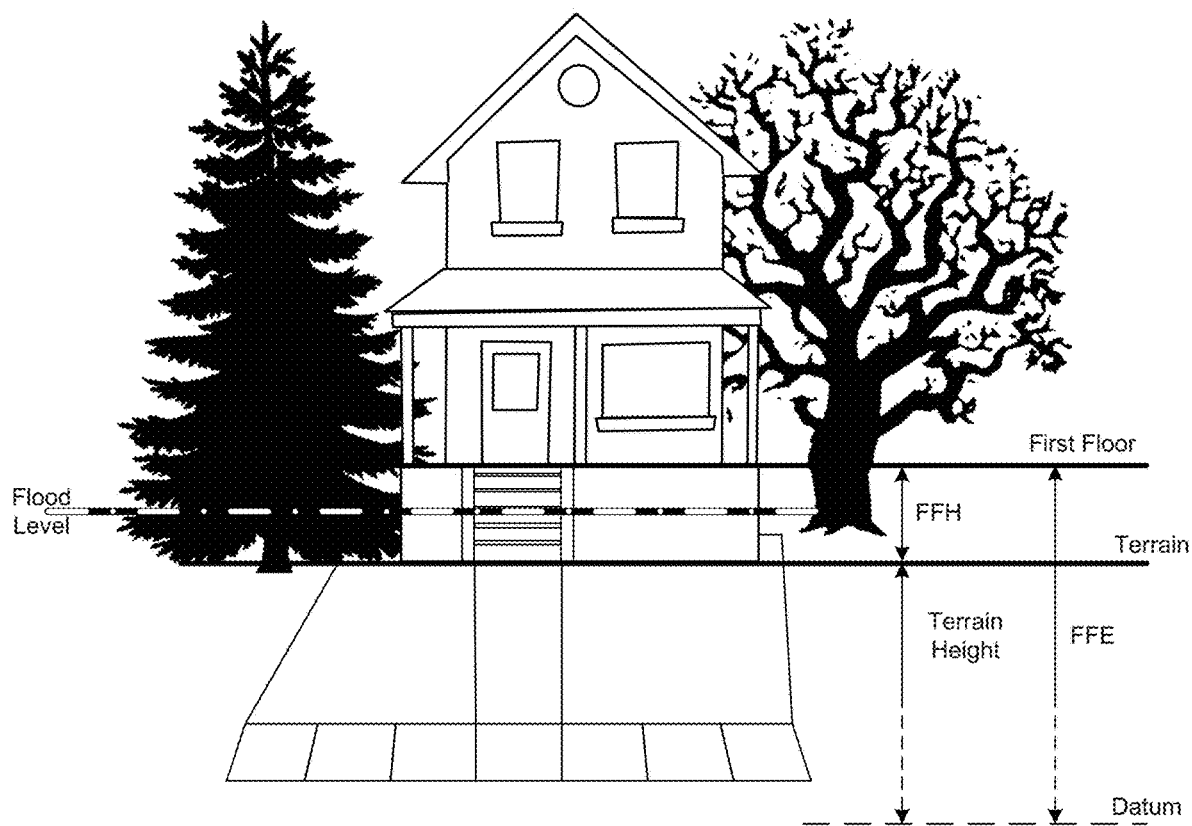
FIG. 1 shows an example image of a building with a first floor.

FIG. 1 shows an example image of an architectural structure (e.g., a building) with a first floor. For example, FIG. 1 illustrates the distinction between terrain and first floor. In some embodiments, the height of the terrain (e.g., measured with respect to a datum) can be determined using DTM elevation data, and the first floor height (abbreviated "FFH" in FIG. 1) can be determined using image segmentation techniques. Embodiments disclosed herein are directed at generating an estimate of the FFH. FIG. 1 also shows examples of datum, terrain, first floor, and flood levels (shown with dashed dot lines in FIG. 1). In some embodiments, the flood level is estimated to lie between the terrain and the first floor.

2.1 Digital Terrain Model (DTM)

In some embodiments, a Digital Terrain Model can be used to determine a ground elevation of a structure above the ground. The DTM can be generated using an elevation dataset (prepared using data captured by remote aerial sensors) providing Data Elevation Models (DEMs) and schedules for a geographical area corresponding to a location of the building. For example, the schedules can indicate lists of geographical locations of buildings in the fifty (50) states in the United States. Further, the lists of geographical building locations can be validated/verifying implying that the information of the geographical building locations is accurate. A few of the advantages of the disclosed technology are as follows:

The dataset is completely contiguous from coast to coast, with uniform specifications everywhere.

Interferometric Synthetic Aperture Radar (IFSAR) remote sensing technology penetrates clouds, smoke, and haze to produce sharp, highly detailed images in any weather.

The DTM is free of gaps and interpolated data.

Terrain data is regularly updated to current as possible, allowing more accurate cross-border geospatial analyses.

The DTM elevation has high resolution (e.g., five (5) meters) and is accurate to one (1) meter (LE90) vertical precision, in absolute terms.

The DTM is accurate to sub-foot levels in relative terms (e.g., for point-to-point measurements).

In some embodiments, the principle elevation dataset built from the IFSAR data collection is a Digital Surface Model (DSM), which includes trees, buildings, and other objects that represent the first surface encountered by the radar signals. From the DSM, a DTM can be created, a DTM being a representation of the bare earth (e.g., without trees, buildings, etc.).

2.2 Machine Learning

In some embodiments, First Floor Elevation (FFE) estimation employs machine learning tools. For example, deep neural networks with over 100 neural layers can be used in image classification because of their ability to develop a set of abstract relationships between data points. These relationships are established based on the activation pathways of nodes through each layer of the model. The learned features are then capable of identifying classes of interest on a new set of data. This ability to amalgamate information and recognize key patterns makes machine learning tools suitable for the disclosed technology. For example, images used as input in the present system include significant variations in content (e.g., design of the buildings) and structure (e.g., look angle, zoom level, etc.).

Deep convolutional neural networks (CNNs) are a specific class of machine learning algorithms which are implemented for image analysis and/or image segmentation (e.g., as disclosed herein), or, simply, pixel-based classification of an image. These networks are ideal for image-based applications because convolutional layers preserve the spatial relationships between pixels. The actual identification of specific classes of pixels is done in the final layer using a non-convolutional neural layer. This is advantageous because abstract features learned by pre-trained models can be fine-tuned for a specific dataset of interest, considerably reducing processing time, computational power and, furthermore, the amount of reference data (e.g., DTM data) needed to train the model for the desired classes.

In some embodiments, the building recognition model is trained on a few dozen example images with manually defined features. The example images can be augmented using image manipulation techniques—flipping, rotating, adding noise, etc.—to build a dataset of several hundred images. These images can be used to fine-tune a pre-trained model for the present technology. In some embodiments, the training can be initialized using a pre-trained version of Microsoft's ResNet-101 model. During pre-training, the weights of the model are computed using the ImageNet dataset with 1.28 million images and 1,000 classes. Leveraging the ImageNet model can improve training speed and accuracy of the final model.

3. Instance Segmentation

The first stage of the disclosed process is to use an image segmentation tool (generally, a machine learning tool) to classify/segment features of the image of the building. Each feature extracted from the image is mapped to an instance of a class. For example, each individual car (e.g., an extracted feature) in an image of a street can be regarded as a separately recorded instance of the class 'vehicle.'

In some implementations, an instance segmentation algorithm identifies one or more polygons around each instance of a class. As one example implementation, the present technology utilizes the instance segmentation algorithm named "Mask R-CNN" from Matterport and available on GitHub. Mask R-CNN is an extension of the object detection algorithm Faster R-CNN. Mask R-CNN adds a mask 'head'—neural classification layer—which classifies pixels within every bounding box as 'object' or 'not-object.' The resulting output is a binary mask for each object instance in the image. Thus, Mask R-CNN detects individual objects in an image and draws a bounding box (polygon) around an object.

Not only does Mask R-CNN allow detection of precise locations of objects in an image, but additionally provides (as output) the number of different objects within a class. This is useful for objects, such as stairs, where multiple instances of a class are adjacent to each other in the image. Mask R-CNN detects and classifies each of these instances separately so that the number of stairs in a staircase is included in the output.

The present technology is not limited to employing the Mask R-CNN algorithm. For example, alternative implementations of Mask R-CNN (such as Detectron provided by FACEBOOK®) or an entirely different instance segmentation algorithm, such as DeepMask, can be used in the disclosed technology.

Furthermore, in alternate embodiments, image segmentation algorithms which classify pixels without differentiating individual objects can also be used with suitable modification. One modification can be a post-processing step to separate non-adjacent clusters of same-class pixels.

3.1 Feature Identification

Advantageously, the present technology has broad applicability because there is no limitation on a machine learning algorithm for image segmentation. Regardless of which machine learning algorithm is used, in some embodiments, a machine learning algorithm for image segmentation can identify several key features (e.g., physical layout elements) of a building. Based on the context of discussions herein, the term "features" or "physical layout elements" can refer to a special case of generic "objects" based on detecting characteristics of a building that are of real-world interest for purposes of estimating the first floor height of the building. For example, the five key physical layout elements or features can be doorways, windows, stairs, garage doors, and building extents defining the outer edges of the building visible in the image. (In alternate embodiments, more than five features or physical layout elements can be identified from an image. For example, additional features can include double-wide doorways separate from single doors, retaining walls from the sidewalk, and other features.).

Figure 2:
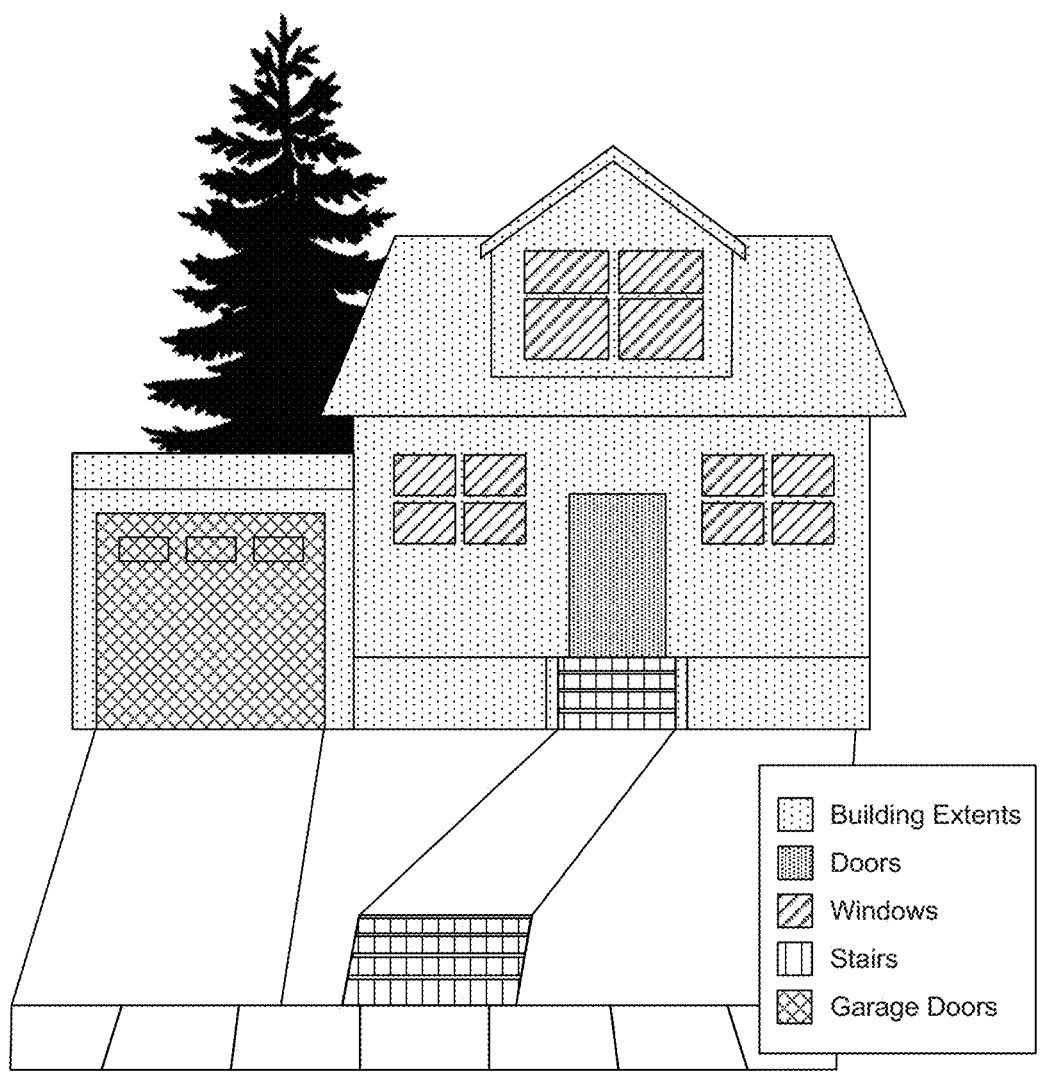
FIG. 2 shows an example image of a building with segmented physical layout elements.

FIG. 2 shows an example image of a building with segmented features/physical layout elements. In this example, the segmented features (in the form of polygons drawn around features) are provided as ground truth information (e.g., as input) to train the image segmentation model. The segmented features shown in FIG. 2 correspond to the above-mentioned five features/physical layout elements of the building. During the training phase, ground truth information is fed to the model so that the model can recognize features in new images during a subsequent prediction stage. As a result, the trained model can indicate features of the building by drawing polygons around the features. A polygon drawn around a feature corresponds to the model predicting that pixels included within the polygon (including the edges of the polygon itself) are part of a single feature. The class prediction value for each individual polygon indicates the type of feature (e.g., windows, doorways, stairs etc.) identified by the polygon. For example, there is a window polygon, a doorway polygon, a stairs polygon, a garage door polygon, a building extent polygon, etc.

Advantageously, the example features shown in FIG. 2 carry implicit information about the interior layout of a building, which is detected without being able to see inside. That is, for example, by identifying the location of doors, windows, garage doors, and other exterior features in an image of a building, implicit information about locations of interior features such as floor locations can be estimated. Accordingly, the exterior features of a building computationally identified by processing an image of a building can be useful for estimating the position of the first floor. For example, doorways are useful features to be detected because they are at the level of the residential floors of a home. The correct detection of a doorway significantly increases the reliability of the predicted first floor height.

In some images, windows can indicate presence of a basement. Windows are included as a class because they can be similar in appearance (e.g., similar shape, frames, etc.) to doors. One advantage of including windows as a separate class (rather than part of the class representing the background of non-object pixels) is that it enables the model to learn properties that differentiate doors and windows. This reduces the likelihood of falsely classifying a window as a door.

Garage doors and stairs are secondary indicators of the residential levels of a home. If a doorway is not visible in the image, alternately, the garage doors and/or stairs can provide the contextual information to infer the location of a doorway or the first floor position.

If none of the above features are present, then it can be inferred that there are not enough contextual clues in the image to draw reliable conclusions.

The building extents (e.g., boundaries of a building) are collected in order to provide context for the location of other features relative to the surrounding environment. The lower edge of the building can be useful as a point of reference relative to the positions of the other features. In some embodiments, contextual information about a building can be gleaned from sources other than the building, such as, for example, the state/geographical territory where the building is located, information related to one or more other buildings in the same location as the building, etc.

At the end of the training phase, the image to be segmented is fed into the image segmentation model (a/k/a a machine learning algorithm) as input. Accordingly, the image segmentation tool predicts the structural layout elements of the building as output. Examples of the structural layout elements are doorways, windows, stairs, garage doors, and building extents.

4. Image Interpretation

In the next stage of the process, the structural layout features (output by the ML tool) are used to determine at least two locations in the segmented image: first floor position and grade position. The first floor position is the point of interest to determine first floor height and elevation. However, without the grade position, i.e., the point where the building meets the ground in the image, there is no point of reference to measure the first floor position.

Figure 3:
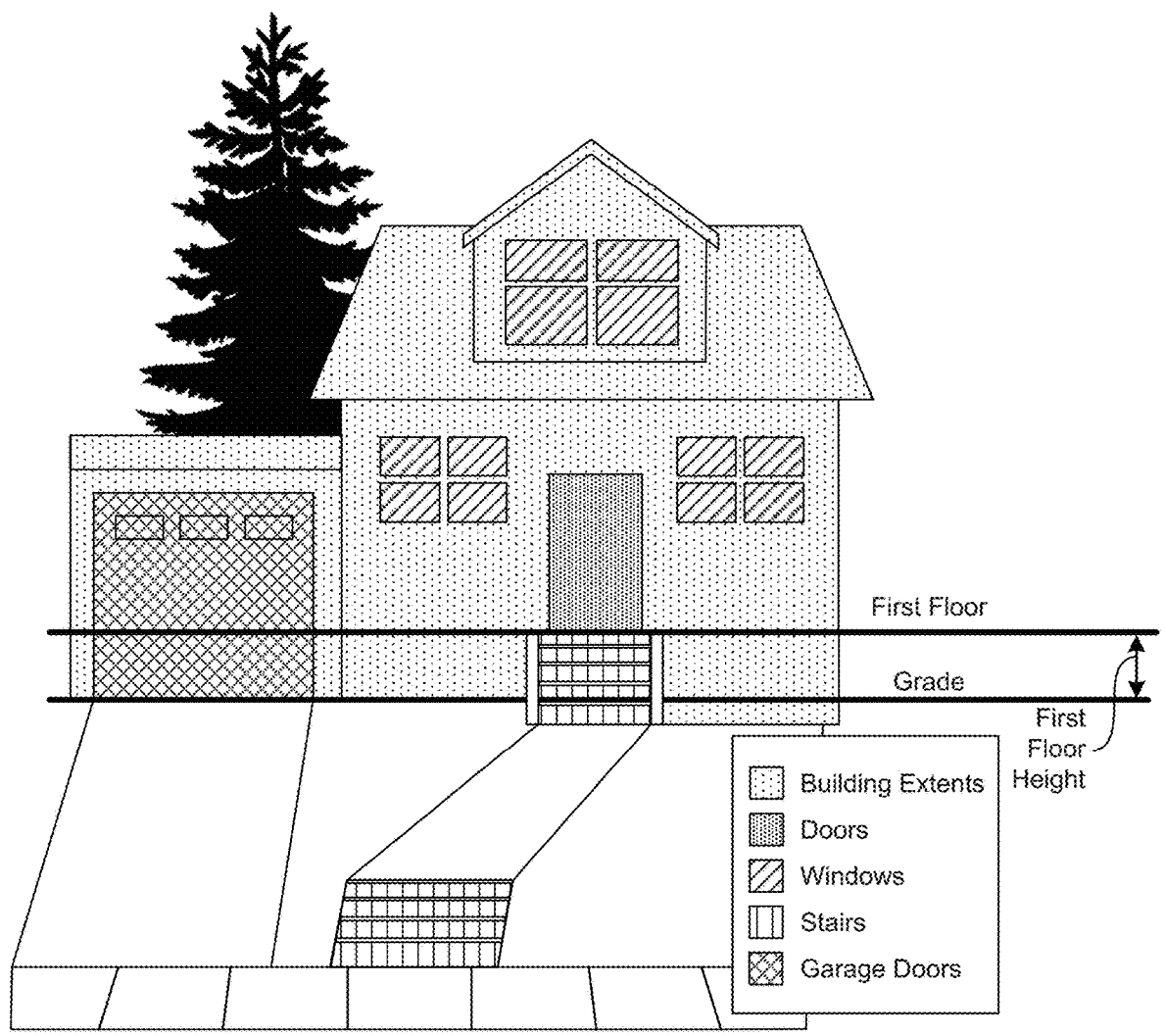
FIG. 3 shows an example image of a building with first floor and grade positions.

FIG. 3 shows an example image of an architectural structure/building with first floor and grade positions. Embodiments disclosed herein are directed at generating an estimate of the first floor height, based on a difference between the position of the first floor and the position of the grade.

4.1 First Floor Position

In some embodiments, the disclosed techniques can identify the first floor position at the bottom of the lowest doorway in the image, based on identifying a pixel associated with the first floor position and another pixel associated with the grade position. In some embodiments, the disclosed techniques sets the first floor position in the image as the bottom row of pixels in the lowest valid doorway in the segmented image. In some embodiments, as a check to increase robustness, the disclosed techniques can verify that the ratio of doorway height to width (in the segmented image) falls within the standard external door height to width ratios. Features or physical layout elements that do not conform to the expected ratio may be misclassified. Thus, a doorway is determined to be valid if the ratio of doorway height to width falls within the standard external door height to width ratios.

If a doorway is not detected, the top of a staircase or the bottom of a garage door can be good potential indicators of the first floor position. In some embodiments, both features can be present in a segmented image. In some embodiments, the bottom of a garage door can be set as the first floor if the lowest point on the garage door is higher than the top stair. This can imply that the stairs may not lead directly to a door (possibly up a sloped lawn instead), since garages are not built above the first floor of a home. However, if the stairs are higher, then the garage door is likely either a basement garage or there is a front porch, requiring stairs to the doorway. In those embodiments, the top of the stairs can be considered as a choice for the first floor position.

Figure 4:
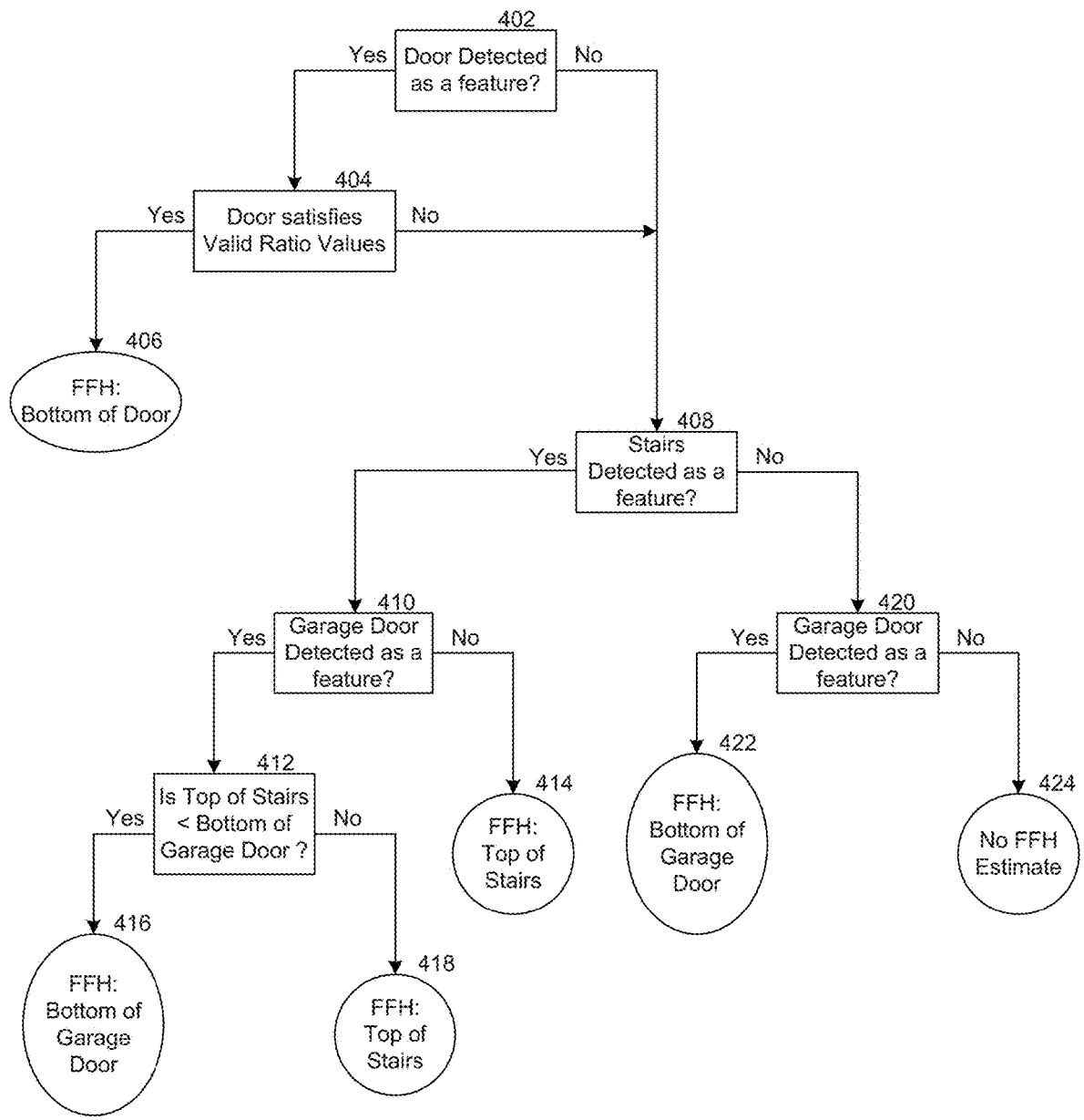
FIG. 4 shows an example decision tree used in generating an estimate of a first floor height of a building.

FIG. 4 shows an example decision tree process for generating an estimate of a first floor height (FFH) of an architectural structure/building based on analyzing a segmented image (e.g., obtained at the output of a machine leaning algorithm) of a building. Upon estimating the first floor height, the decision tree is terminated. At step 402, the process determines if a doorway is detected as a key physical layout element in the segmented image. If yes, then the process determines (step 404) if the ratio of the width and height of the doorway satisfies valid doorway ratio values. For example, valid doorway ratio values can lie within a predetermined range. If the ratio of the width and height of the doorway satisfies valid doorway ratio values, the process estimates (step 406) the first floor height based on a pixel located in the bottom of the doorway in the segmented image. At step 402, if the process determines that a doorway is not detected, or a detected doorway doesn't satisfy valid doorway ratio values, then the process moves to a next step (i.e., step 408) to determine if stairs are detected as one of the physical layout elements or features in the segmented image.

At step 408, the process determines if stairs are detected as one of the features in the segmented image. If yes, the process moves to step 410. If no, the process moves to step 420. Both at step 410 and at step 420, the process determines if a garage door is detected as one of the features in the segmented image. At step 410, if the process determines that a garage door is detected as one of the features in the segmented image, then the process moves to step 412. At step 410, if the process determines that a garage door is not detected as one of the features in the segmented image, then the process estimates (step 414) the first floor height based on a pixel located at the top of the stairs in the segmented image. At step 420, if the process determines that a garage door is detected as one of the features in the segmented image, then the process moves to step 422 in which the process estimates the first floor elevation based on a pixel located at the bottom of the garage door in the segmented image. At step 420, if the process determines that a garage door is not detected as one of the features in the segmented image, then the process determines (step 424) that a first floor height cannot be estimated from the segmented image. This scenario arises when no doorways, no stairs, and no garage doors are detected in the segmented image.

At step 412, the process checks if a pixel located at the top of the stairs is lower than a pixel located at the bottom of the garage door. If yes, the process estimates (step 416) the first floor height based on a pixel located in the bottom of the garage door in the segmented image. The pixel in the bottom of the garage door can be the pixel used in decision block 412. If no, the process estimates (step 418) the first floor height based on a pixel located at the top of the stairs in the segmented image. The pixel in the bottom of the garage door can be the pixel used in decision block 412.

4.2 Grade Position

The grade position is the point where the building meets ground level. While terrain corresponds to the ground surrounding a building, "grade" refers to the terrain immediately adjacent to a building. The ground level in a segmented image of a building is computed using the DTM elevation (in the DTM obtained from IFSAR images) of the geographical area corresponding to a location of the building.

In some embodiments, the grade position is determined in the image by the extents of the building. To determine the grade position, in accordance with disclosed embodiments, pixels above the first floor position in the building extents are discarded. If the top of a garage door is below the first floor position (indicating a basement garage), then pixel columns in line with the garage door are discarded. In other words, line-wise columnar pixels are discarded. This is to avoid biasing the grade level downwards by including basement pixels. In some embodiments, the median value of the lowest pixel row in all columns is calculated and set as the grade position. The median value is used to reduce the impact of features like shrubs, which tend to bias the building extents too high, and physical layout elements like porch stairs, which bias the building extents too low. The median, in particular, is less sensitive to outliers than the mean value, which also reduces the risk of a biased position. In alternate embodiments, a suitable statistic (e.g., an arithmetic mean or a weighted average) different from the median value can be used.

In some embodiments, once the first floor position and the grade position are determined, the number of pixels between the two positions (pixel height differential) is computed as the pixel height of the first floor above the ground. The first floor position is detected/recognized as the first pixel and the grade position is detected/recognized as the second pixel. The pixel height differential is computed as an intervening number of pixels (in the segmented image) spatially located in between the first pixel and the second pixel. In some embodiments, the pixel height differential is expressed in pixels.

5. Scale Extraction

In some embodiments, the scale of the image is computed so that the scale of the image can be used to convert the first floor elevation (calculated in pixels) to real-world dimension units (e.g., inches, feet, meters, or other distance-based units of measurement), and therefore the scale of the image is determined. Thus, the final step of the process is to estimate or compute an image scale (e.g., a scale factor) which allows conversion of the first floor height expressed in pixels into real-world dimension units. Traditional photogrammetric techniques are very accurate at extracting real-world measurements from photos. However, photogrammetry requires images taken from a known position with calibrated cameras.

The disclosed first floor elevation (FFE) estimation process is designed to work with uncontrolled images, e.g., those collected using consumer-grade cameras which do not need to be calibrated. Further, the information about the environment surrounding a building with respect to a known position as used in conventional photogrammetric techniques may not be available. Advantageously, the methods disclosed herein for computing or estimating a scale factor are irrespective of a type of camera (e.g., camera-agnostic) and a type of image. That is, no special cameras are required for capturing images used in generating an estimate of the first floor elevation of a building.

Typically, doorways have standardized dimensions that can be used in determining height to width ratios. In embodiments disclosed herein, this property of doorways is used for computing image scale. External human doorways in North America typically have a small range of standard sizes. For example, the height of a standard doorway is 80 inches and the width is generally 36 inches. As other examples, doorway widths of 30 and 32 inches also exist.

Figure 5:
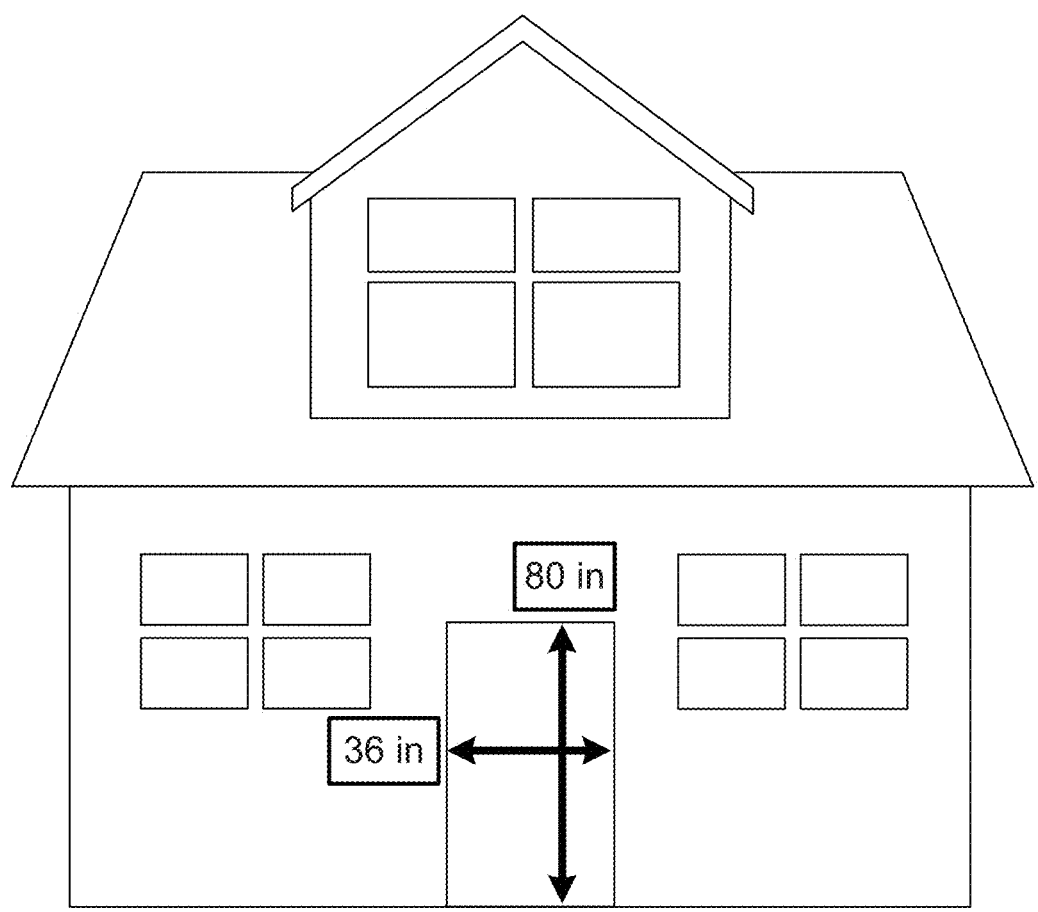
FIG. 5 shows an example of doorway dimensions used in computing image scale.

FIG. 5 shows an example of doorway dimensions used in computing or estimating image scale. In FIG. 5, the doorway dimensions are expressed in real-world dimension units of inches, e.g., 80 inches×36 inches. In some embodiments, the height of a doorway (detected in a segmented image) can provide the image scale (e.g., a ratio of real-world dimension units to pixels) needed to convert the first floor height from pixels to inches. The scale can then be applied to the pixel height differential (e.g., number of pixels between the first floor position and the grade position). As a result, the first floor height can be obtained in real-world dimension units (e.g., inches, feet, or meters). The first floor height can be added to the DTM elevation (e.g., in an area corresponding to the geographical location of the building) to obtain the resulting FFE value. Although the discussions pertaining to estimation of the scale factor are based on doorway dimensions, such discussions are for illustration only. In alternate embodiments, standardized dimensions of other layout elements (such as stairs or garage doors) can be used for estimating image scale.

Figure 6A:
FIG. 6A shows an example grayscale image of a building.

FIG. 6A shows an example grayscale image of a building. The image in FIG. 6A is captured using a regular, consumer-grade camera (e.g., without special functionalities).

Figure 6B:
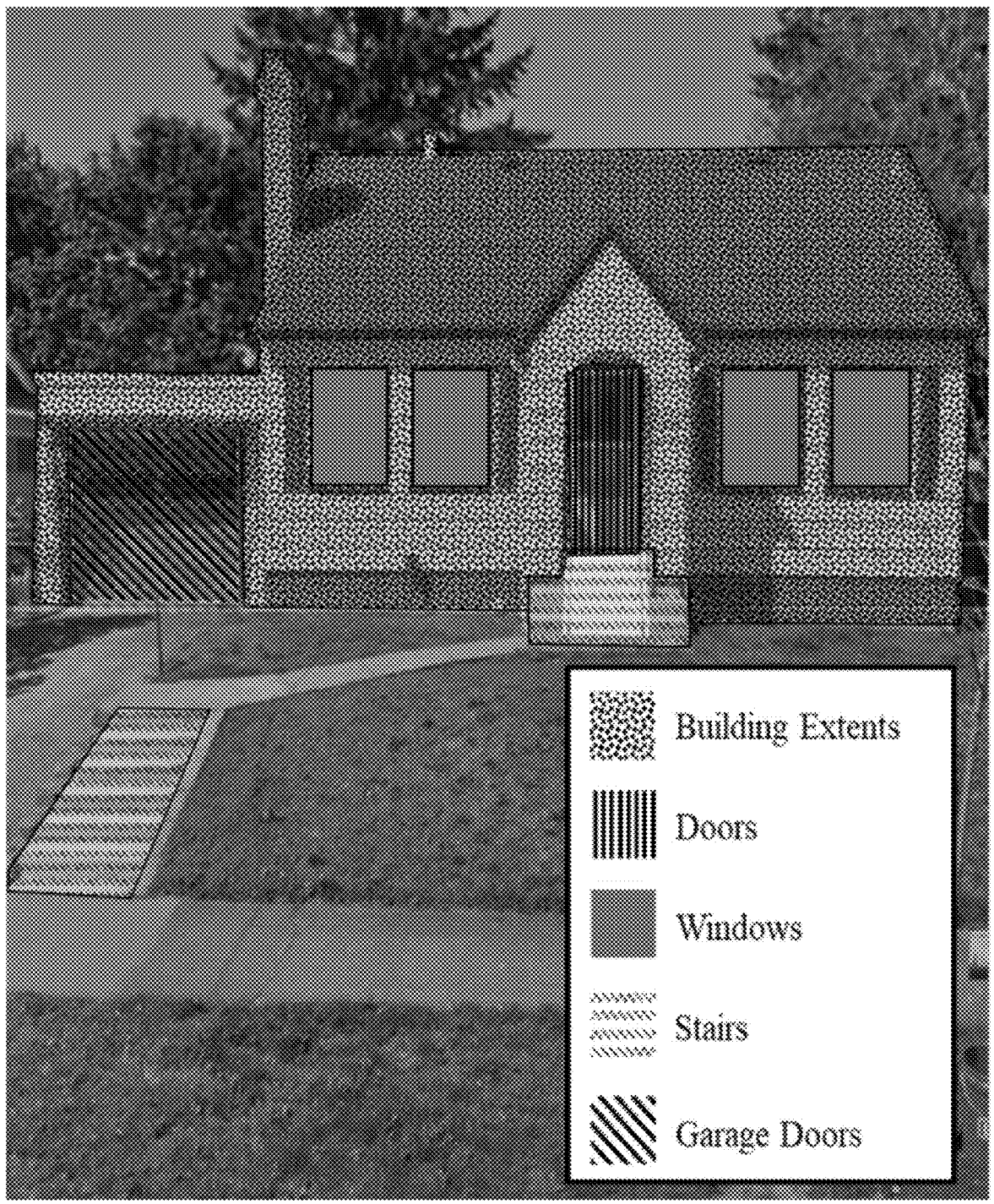
FIG. 6B shows an example grayscale image of a building as a result of segmenting the image shown in FIG. 6A.

FIG. 6B shows an example grayscale image of a building as a result of segmenting the image shown in FIG. 6A. The image in FIG. 6B can be generated at the output of a machine learning algorithm (such as Mask R-CNN) that has been trained to identify multiple features or physical layout elements in an image of the building. For example, FIG. 6B shows building extents, doors, windows, stairs, and garage doors (identified by the machine learning algorithm) from the image in FIG. 6A. FIG. 6B also shows that the machine learning algorithm draws polygons surrounding the identified features. The pixels within a polygon including the edges of the polygon are identified to be a part of a feature. FIG. 6B shows that there is a window polygon, a doorway polygon, a stairs polygon, a garage door polygon, a building extent polygon, etc. Thus, processing the segmented image is equivalent to processing the data relating to the respective polygons. For example, a step to identify a top of a garage door corresponds to computationally identifying (in the garage door polygon) data relating to the top of the garage door.

Figure 6C:
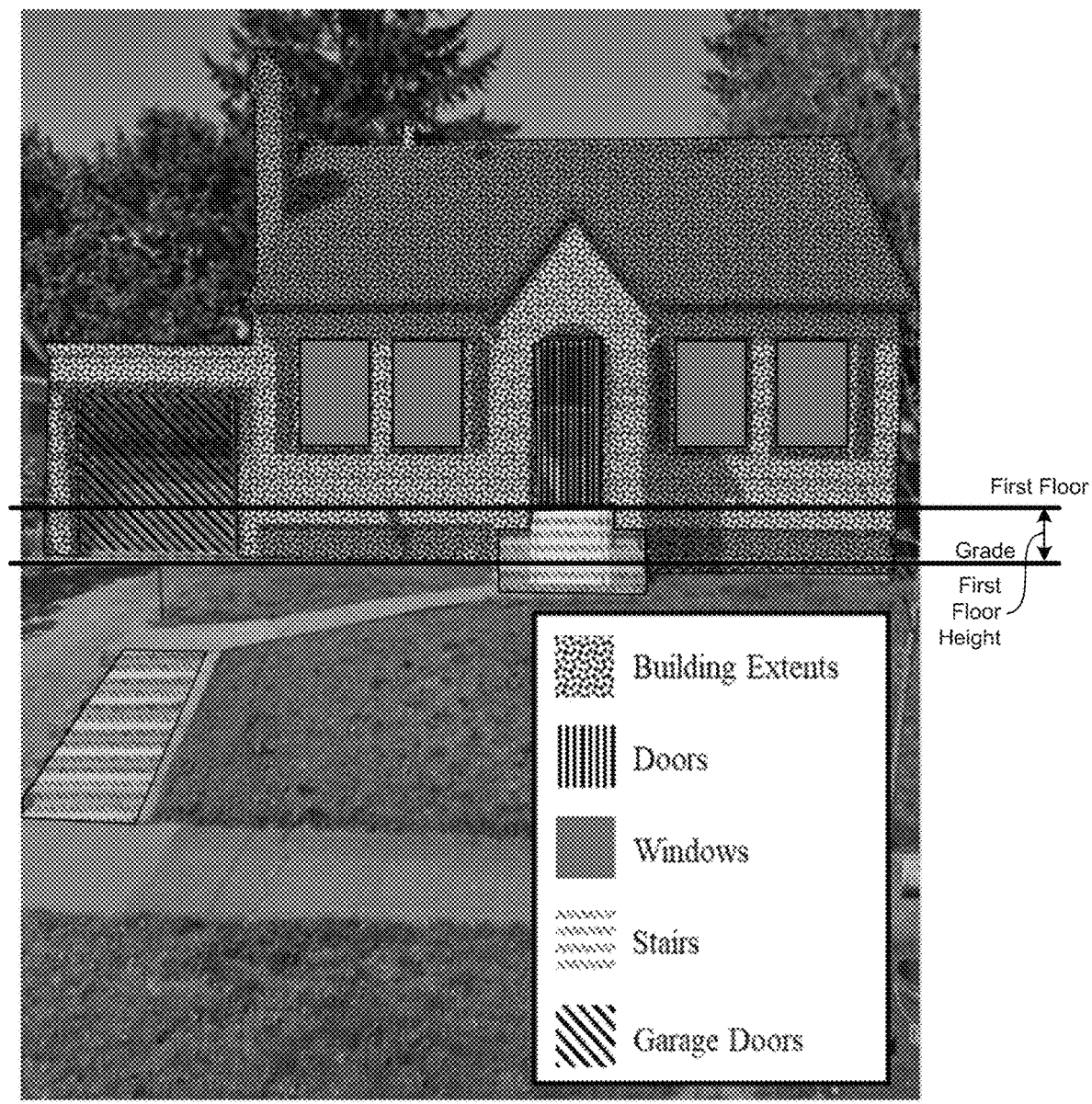
FIG. 6C shows an example grayscale image of a building based on identifying a first floor position and a grade position in the segmented image of FIG. 6B.

FIG. 6C shows an example grayscale image of a building based on identifying a first floor position and a grade position in the segmented image of FIG. 6B. In addition to the key features, FIG. 6C also shows horizontal lines indicating the position of the first floor and the position of the grade, using the methods disclosed herein. For example, based on processing the segmented image in FIG. 6B, the methods disclosed herein can identify a first pixel location corresponding to the first floor position and a second pixel location corresponding to the grade position. The difference between the first pixel location and the second pixel location is estimated as the first floor height.

Figure 7:
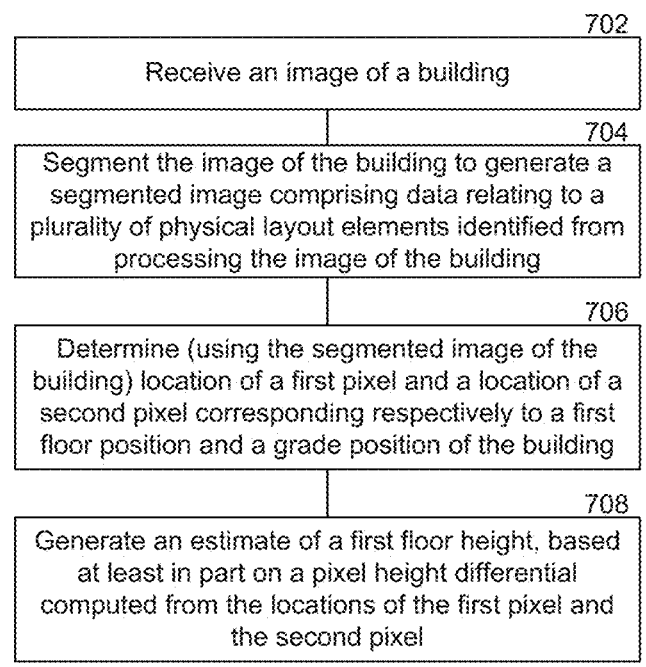
FIG. 7 shows an example flowchart of a method for generating an estimate of the first floor height of a building.

FIG. 7 shows an example flowchart of a process for generating an estimate of the first floor height of an architectural structure (e.g., a building). While one or more steps of this flowchart are described in terms of processing the segmented image, it will be understood that the steps are equivalent to processing the data relating to the respective polygons of the physical layout elements. At step 702, the process receives an image of a building. At step 704, the process segments the image of the building to generate a segmented image comprising data relating to several physical layout elements or features identified in the image of the building. For example, the segmented image identifies data relating to doorways, stairs, garage doors, building extents, and other physical layout elements of the building. At step 706, the process determines a first pixel location and a second pixel location corresponding respectively to a first floor position and a grade position of the building. At step 708, the process computes a pixel differential (e.g., based on a difference between the first pixel location and the second pixel location) to generate an estimate of the first floor height of the building. The process selects a lowest doorway from one of the doorways identified in the segmented image of the building and determines a bottom row of pixels included in the lowest doorway. The process sets the first pixel location in accordance with the bottom row of pixels of the lowest doorway in the segmented image. That is, the first pixel location is assigned as the index or row number of the bottom row of pixels in the lowest doorway of the segmented image. In some implementations, the first pixel location can be computed as a mathematical function (e.g., median or mean) of several bottom rows of pixels identified in the segmented image. For example, if the lowest doorway only is considered, then the bottom row for each column in the doorway polygon can be identified and the median (or, mean) of the row indices can be computed. The process identifies the second pixel location in the following manner. First, the process discards pixels that are located spatially above the first pixel and bounded by the building extent. If pixels associated with the top of a garage door are located below the first pixel, then the garage door pixels may not be below the first pixel location (i.e., FFH pixel). Upon determining that pixels associated with a top of the garage door in the segmented image are located spatially below the identified first pixel, the process discards (from the building extents polygon) columnar pixels in line with the garage door. In other words, if a garage door is identified below the FFH pixel, then pixels in the building extents polygon that are in the same column as the garage door polygon are discarded. From the columnar pixels remaining in the segmented image and bounded by the building extent, the process sets the second pixel location based on a mathematical function of the lowest rows of columnar pixels remaining in the segmented image. Examples of the mathematical function can be a median of the locations of the lowest rows of columnar pixels, an arithmetic mean of the locations of the lowest rows of columnar pixels, or a weighted mean of the locations of the lowest rows of columnar pixels.

The first floor height estimated in step 708 is in pixels. In some embodiments, the process converts the first floor height from pixels to real-world dimension units based on computing a scaling ratio (or equivalently, a scaling factor) of the image of the building. In some embodiments, the scaling ratio can be computed using a size of a doorway (or, generally a size of a physical layout element) in the segmented image of the building. In some embodiments, the scaling ratio can be estimated from sizes of more than one physical layout elements (e.g., with standardized real-world dimensions). In some embodiments, the process generates a DTM elevation of a geographical area surrounding (or, corresponding to) a location of the building. The process adds the DTM elevation to the first floor height (in real-word dimension units) to compute a first floor elevation expressed in real-world dimension units. Advantageously, the estimated first floor height can be used for modeling flood risk, earthquake risk, or modeling other types of risks arising from man-made, economic, or natural calamities. Alternatively, the estimated first floor height can also be used for city reconstruction, urban planning, design, mapping, and navigation purposes.

Figure 8:
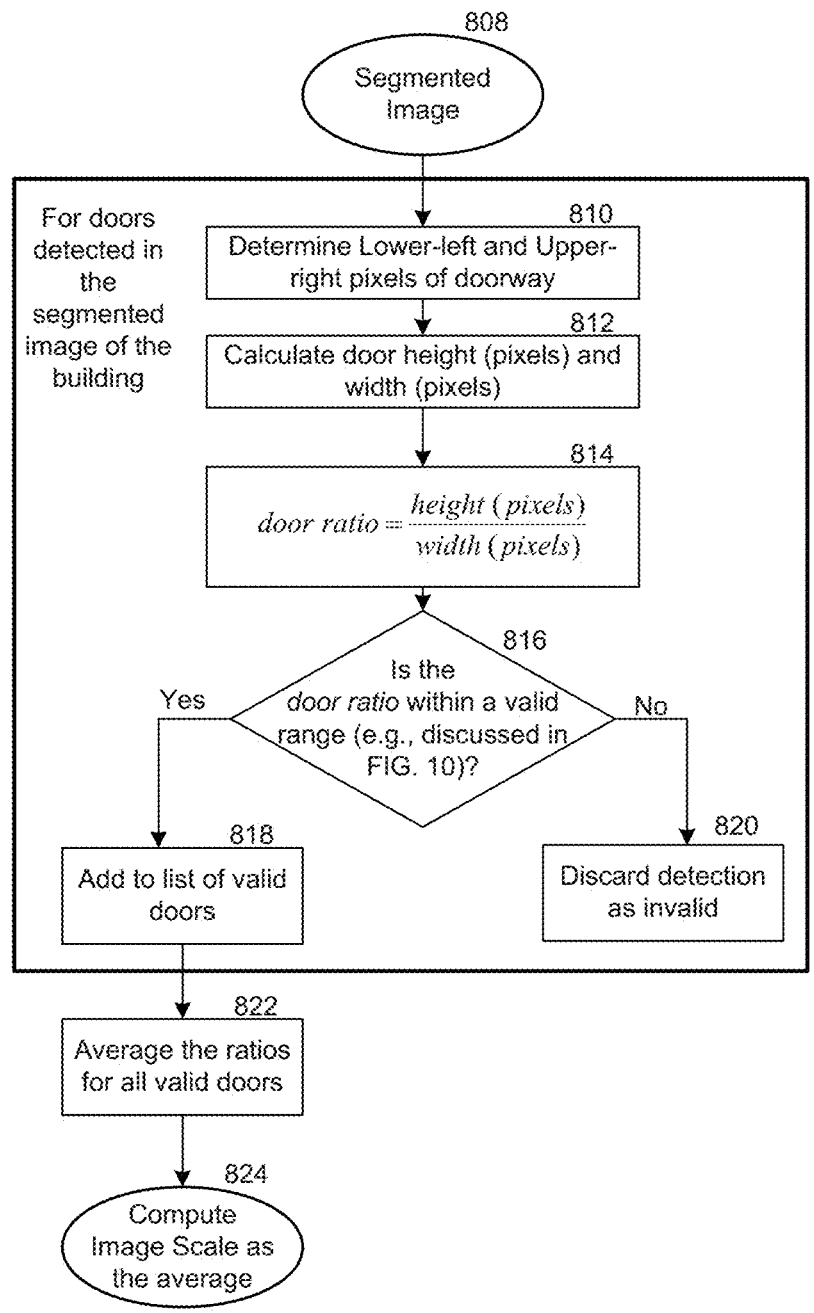
FIG. 8 shows an example flowchart of a method for computing image scale.

FIG. 8 shows an example flowchart of a process for computing an image scale. While one or more steps of this flowchart are described in terms of processing the segmented image, it will be understood that the steps are equivalent to processing the data relating to the respective polygons of the physical layout elements. At step 808, the process receives (as input) a segmented image (e.g., generated by a machine learning algorithm) identifying key features or physical layout elements in the image of an architectural structure/building. One of the key features of the building can be a doorway. At step 810, the process determines a the upper/lower-most and the right/left-most pixels of the doorway. At step 812, the process calculates a doorway height (in pixels) and a width (in pixels). The doorway height is calculated as the difference between the upper-most and lower-most pixel in the "doorway" polygon. Similarly, the width is calculated as the difference between the right-most and the left-most pixel. At step 814, the process computes a doorway ratio as a ratio of the height and width. At step 816 the process determines if the doorway ratio lies within a valid range (e.g., discussed in connection with FIG. 10). If the doorway ratio lies within a valid range, the process adds (step 818) this doorway to a list of valid doorways of the building. If the doorway ratio does not lie within a valid range, the process discards (step 820) the doorway as an invalid detection. The process performs steps 810, 812, 814, 816, 818, and 820 for the doorways (which can include some or all doorways) detected in the segmented image. As a result of performing steps 810, 812, 814, 816, 818, and 820, valid doorways are identified. The process maintains a list (e.g., as shown in step 818) of all valid doorways. At step 822, the process computes an average of the doorway ratios of the valid doorways of the building. At step 824, the process computes the image scale as the average value. The image scale computed in step 824 can be regarded as an estimate of the image scale.

Figure 9:
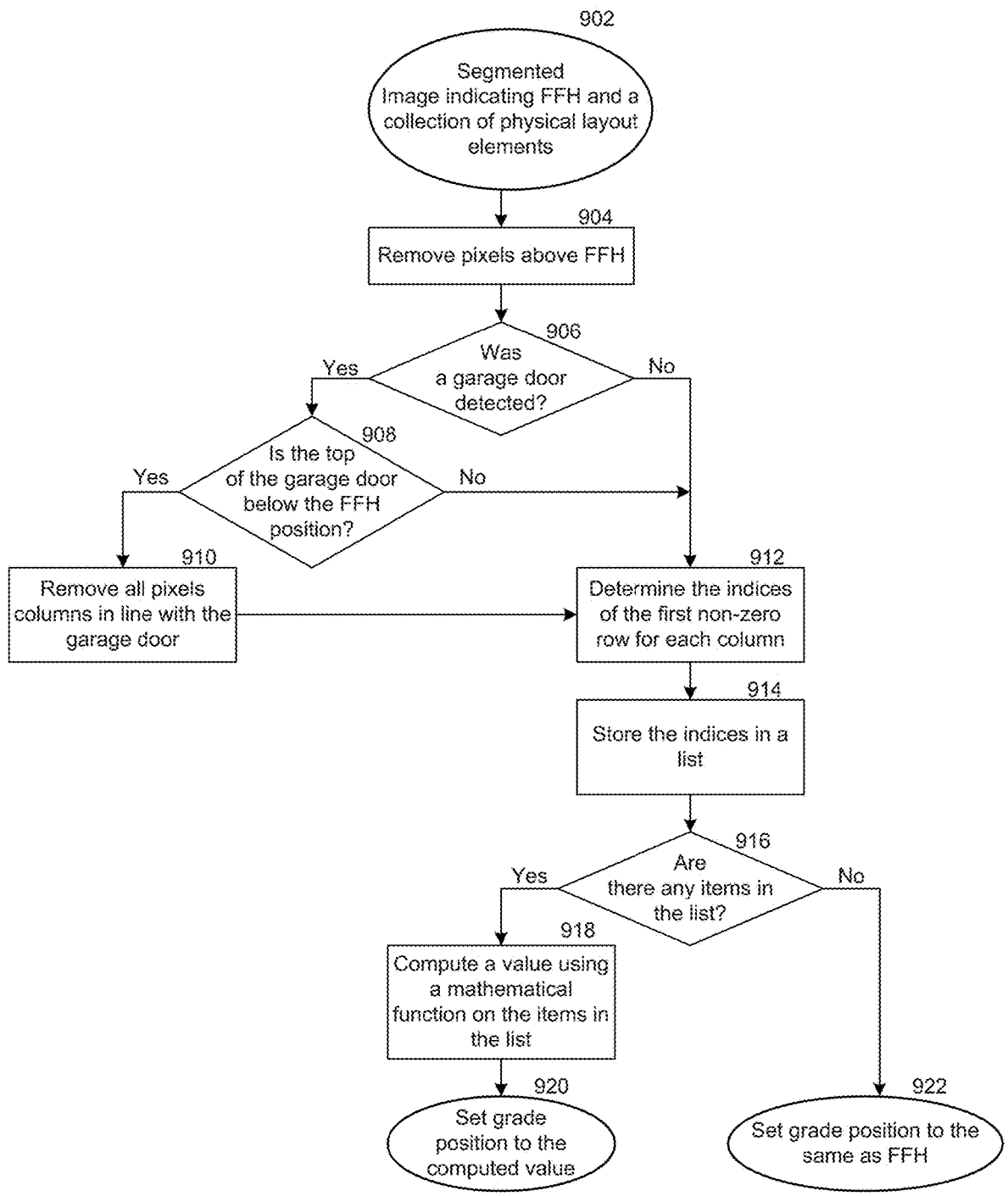
FIG. 9 shows an example flowchart of a method for computing a grade position of a building.

FIG. 9 shows an example flowchart of a process for computing a grade position of an architectural structure/building. At step 902, the process receives (as input) a segmented image indicating a collection of physical layout elements (e.g., features) and the position of the first floor height (FFH) of a building, e.g., as shown in FIG. 6C. The steps discussed herein generally pertain to modifications and/or operations on the segmented image. Hence, the process can either perform its modifications and/or operations on the original segmented image, or alternately, the process can pull the relevant information from the polygon-based classifications of pixels from segmentation of the image. In other words, while one or more steps of this flowchart are described in terms of processing the segmented image, it will be understood that the steps are equivalent to processing the data relating to the respective polygons of the physical layout elements. At step 904, the process removes pixels above the FFH position in the segmented image and bounded by the building extents. This is because the grade position would generally lie either at the FFH position or below the FFH position. At step 906, the process checks if a garage door was one of the physical layout elements detected in the segmented image. If yes, the process checks if the top of the garage door is below the FFH position in the segmented image. If no, the process moves to step 912. If yes, in step 910, the process removes (from the building extents polygon) pixel columns (e.g., columnar pixels) that are in line with the garage door and moves to step 912. In other words, the process discards line-wise columnar pixels from the building extents polygon that are in the same column as pixels in the garage door polygon. The top of a garage door below the FFH position indicates a basement garage, in which case, the process removes pixel columns in line with the garage door. This is to avoid biasing the grade level downwards by including basement pixels.

Alternately, if the process determines (step 906) that a garage door was not detected as a physical layout element or the top of the garage door is not below (step 908) the FFH position, the process moves to step 912. At step 912, the process determines indices (e.g., row numbers) of the first non-zero row for each column of pixels in the segmented image. Step 912 is performed on the building extents polygon, which is one of the classes or features obtained from image segmentation. The first non-zero row corresponds to the lower edge of the polygon (and thus the bottom of the structure is detected). In some embodiments, the process scans each column of pixels for better accuracy in estimating the position of the base of the structure. At step 914, the process stores (e.g., in a list) the indices for each column of pixels. At step 916, the process determines if the list is an empty list or not. If the list is empty, then the process determines that there are no pixels below the FFH. Accordingly, the process sets (step 922) the grade position the same as the position of the FFH. If the list, however, is non-empty, then the process uses a mathematical function to compute (step 918) a value based on the indices stored in the list. For example, the mathematical function can be a median, an arithmetic mean, or a weighted mean. It is likely that the detected base of the structure may have natural variations due to obscuring features like shrubs. In use-cases where the detected base is obscured by shrubs, taking the median value of the indices can reduce the impact of these variations. At step 920, the process sets the grade position to the value computed in step 918. The process terminates thereafter.

Figure 10:
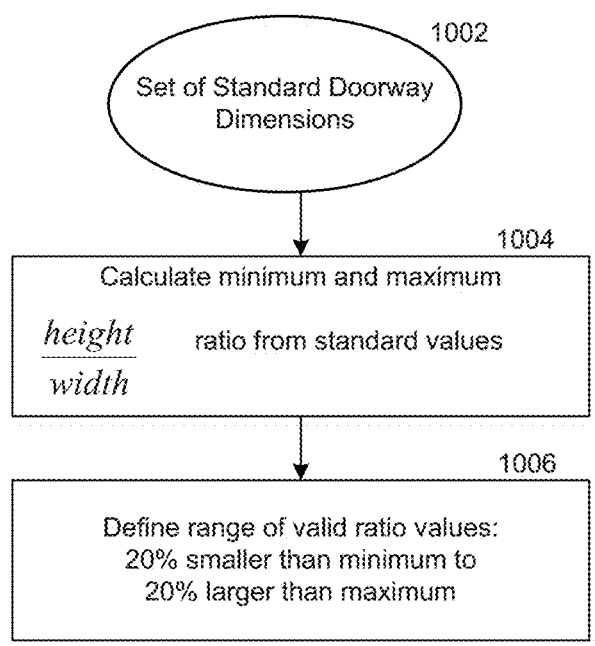
FIG. 10 shows a flowchart of an example method to determine a valid range of doorway dimensions.

FIG. 10 shows a flowchart of an example method to determine a valid range of doorway dimensions. At step 802, the process receives (as input) a set of standard dimensions (e.g., a height and a width) of doorways. For example, one standard doorway in the set can have a height of 80 inches and a width of 36 inches. There can be multiple standard doorways in the set. At step 1004, the process calculates minimum and maximum height-to-width ratios of doorways included in the set. At step 1006, the process defines the valid range of doorway dimensions to be a percentage (e.g., 20%) smaller than the minimum height-to-width ratio and a percentage (e.g., 20%) larger than the maximum height-to-width ratio. Thus, a valid doorway is one whose height-to-width ratio lies in the valid range of doorway dimensions.

In this disclosure, a technique is proposed to leverage datasets and machine learning to computationally estimate the first floor height of a building. Such estimation can significantly reduce the cost and manpower to carry out flood risk assessment of buildings. The result is an automated first floor height estimation process that is faster, machine-generated (without requiring human inputs), dimensionally accurate, and inexpensive. More generally, embodiments disclosed herein can be used for measuring physical features based on an image of an object, where physical or in-person measurements are not practical. Although the discussions herein are presented using examples of first floor height estimation, such discussions are merely for illustrative purposes. In other embodiments, this technology can be suitably used for measuring features present in digital images. Although the discussions herein are presented in terms of using the first floor height estimation techniques for determining flood risk, the embodiments disclosed herein have broader applicability and can be used for automatic feature identification using images, where human analysis is of the images is impractical. For insurance-related use-cases, this includes identification and measurements of physical features of buildings, roads, bridges, and other infrastructure. The disclosed embodiments can also be used for measuring dimensions/physical features of objects that change over time such as inventories, pre-milled timber, or mine tailings.

Some of the embodiments described herein are described in the general context of methods or processes, which may be implemented in one embodiment by a computer program product, embodied in a computer-readable medium, including computer-executable instructions, such as program code, and executed by computers in networked environments. A computer-readable medium may include removable and non-removable storage devices including, but not limited to, Read-Only Memory (ROM), Random Access Memory (RAM), compact discs (CDs), digital versatile discs (DVD), etc. Therefore, the computer-readable media may include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments may be implemented as devices or modules using hardware circuits, software, or combinations thereof. For example, a hardware circuit implementation may include discrete analog and/or digital components that are, for example, integrated as part of a printed circuit board. Alternatively, or additionally, the disclosed components or modules may be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

The foregoing description of embodiments has been presented for purposes of illustration and description. The foregoing description is not intended to be exhaustive or to limit embodiments of the present invention(s) to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention(s) in various embodiments and with various modifications as are suited to the particular use contemplated. The features of the embodiments described herein may be combined in all possible combinations of methods, apparatus, modules, systems, and computer program products.

We claim:

1. A computing system for automating estimation of a first floor height of an architectural structure the comprising:
    at least one aerial sensor configured to collect one or more terrain characteristics of a geographical area corresponding to a location of the structure;
    at least one memory device storing instructions for causing at least one processor to:
        receive an image of the structure;
        segment the image of the structure to generate a segmented image comprising data relating to a plurality of physical layout elements identified from processing the image of the structure;
        determine, using the segmented image of the structure, a first pixel location and a second pixel location corresponding respectively to a first floor position and a grade position of the structure; and
        generate an estimate of a first floor height of the structure, based at least in part on a pixel height differential computed from the first pixel location and the second pixel location, wherein the estimate of the first floor height corresponds to a true, first-floor height of the structure.

2. The system of claim 1, wherein the estimate of the first floor height is expressed in pixels, and wherein the instructions further cause the at least one processor to:
    based at least in part on data relating to a size of one or more physical layout elements included in the data relating to the plurality of physical layout elements identified from processing the image of the structure, compute a scaling ratio of the image of the structure; and
    apply the scaling ratio of the image of the structure to the estimate of the first floor height to convert the estimate of first floor height expressed in pixels into real-world dimension units such that the estimate of the first floor height is applicable for real-world use.

3. The system of claim 2, wherein the estimate of the first floor height is expressed in pixels, and wherein the instructions further cause the at least one processor to:
    use the one or more terrain characteristics of the geographical area corresponding to a location of the structure to generate a digital terrain model (DTM) elevation of the geographical area corresponding to the location of the structure;
    compute the estimate of the first floor height in real-world dimension units; and
    add the DTM elevation to the estimate of the first floor height computed in real-world dimension units to generate an estimate of a first floor elevation expressed in the real-world dimension units.

4. The system of claim 1, wherein the instructions further cause the at least one processor to identify data relating to at least one of: a doorway of the structure, a window of the structure, stairs in the structure, one or more garage doors associated with the structure, or extents of the structure defining outer edges of the structure.

5. The system of claim 1, wherein the instructions to determine the first pixel location corresponding to the first floor position of the structure include instructions further causing the at least one processor to:
    identify data relating to one or more doorways in the segmented image of the structure;
    select data relating to a lowest doorway from the data relating to one or more doorways identified in the segmented image of the structure; and
    set the first pixel location in accordance with a bottom row of pixels included in the data relating to the lowest doorway identified in the segmented image of the structure.

6. The system of claim 5, wherein the instructions to determine the second pixel location corresponding to the grade position of the structure include instructions further causing the at least one processor to:
    identify, in the segmented image of the structure, data relating to a garage door and data relating to an extent of the structure defining an outer edge of the structure; and
    identify the second pixel location by:
        discarding, from data relating to the extent of the structure, pixels located spatially above the first pixel and bounded by the data relating to the extent of the structure;
        upon determining that pixels associated with the data relating to the garage door in the segmented image are located spatially below the first pixel, discarding, from the data relating to the extent of the structure, columnar pixels in a same column as pixels in the data relating to the garage door; and
        setting the second pixel location based on a median value of lowest rows of pixels remaining in the segmented image of the structure and bounded by the data relating to the extent of the structure.

7. The system of claim 6, wherein the mathematical value of the locations of the lowest rows of columnar pixels remaining in the segmented image of the structure and bounded by the data relating to the extent of the structure includes one of: a median of the locations of the lowest rows of columnar pixels, an arithmetic mean of the locations of the lowest rows of columnar pixels, or a weighted mean of the locations of the lowest rows of columnar pixels.

8. The system of claim 1, wherein the instructions for generating the estimate of the first floor height include instructions further causing the at least one processor to:
set the pixel height differential to a number of intervening pixels in the segmented image spatially located in between the first pixel and the second pixel.

9. The system of claim 1, wherein the instructions for generating the estimate of the first floor height include instructions further causing the at least one processor to:
compute a scale factor of the image of the structure irrespective of a type of camera used in capturing the image of a structure, wherein the scale factor allows conversion of the estimate of the first floor height expressed in pixels into real-world dimension units.

10. A method for automating estimation of a first floor height of an architectural structure comprising:
receiving an image of a structure;
segmenting the image of the structure to generate a segmented image comprising data relating to a plurality of layout elements identified from processing the image of the structure;
determining, using the segmented image of the structure, a first pixel location and a second pixel location corresponding respectively to a first floor position and a grade position of the structure; and
generating an estimate of a first floor height of the structure, based at least in part on a pixel height differential computed from the first pixel location and the second pixel location, wherein the estimate of the first floor height corresponds to a true, first-floor height of the structure.

11. The method of claim 10, wherein the estimate of the first floor height is expressed in pixels, further comprising:
based at least in part on data relating to a size of one or more physical layout elements included in the data relating to the plurality of layout elements identified from processing the image of the structure, compute a scaling ratio of the image of the structure; and
applying the scaling ratio of the image of the structure to the estimate of the first floor height to convert the estimate of the first floor height expressed in pixels into real-world dimension units such that the estimate of the first floor height is applicable for real-world use.

12. The method of claim 11, wherein the estimate of the first floor height is expressed in pixels, further comprising:
collecting one or more terrain characteristics of a geographical area corresponding to a location of the structure to generate a digital terrain model (DTM) elevation of the geographical area corresponding to the location of the structure;
computing the estimate of the first floor height in real-world dimension units; and
adding the DTM elevation to the estimate of the first floor height computed in real-world dimension units to generate an estimate of a first floor elevation expressed in the real-world dimension units.

13. The method of claim 10, wherein the data relating to the plurality of layout elements associated with the image of the structure include at least one of: a doorway of the structure, a window of the structure, stairs in the structure, one or more garage doors associated with the structure, or extents of the structure defining outer edges of the structure.

14. The method of claim 10, further comprising:
identifying data relating to one or more doorways in the segmented image of the structure;
selecting data relating to a lowest doorway from the data relating to the one or more doorways identified in the segmented image of the structure; and
setting the first pixel location in accordance with a bottom row of pixels included in the data relating to the lowest doorway identified in the segmented image of the structure.

15. The method of claim 14, further comprising:
identifying, in the segmented image of the structure, data relating to a garage door and data relating to an extent of the structure defining an outer edge of the structure; and
identifying the second pixel location by:
discarding, from data relating to the extent of the structure, pixels located spatially above the first pixel and bounded by the data relating to the extent of the structure;
upon determining that pixels associated with the data relating to the garage door in the segmented image are located spatially below the first pixel, discarding, from the data relating to the extent of the structure, columnar pixels in a same column as pixels in the data relating to the garage door; and
setting the second pixel location based on a median value of lowest rows of pixels remaining in the segmented image of the structure and bounded by the data relating to the extent of the structure.

16. The method of claim 10, further comprising:
setting the pixel height differential to a number of intervening pixels in the segmented image spatially located in between the first pixel and the second pixel.

17. The method of claim 1, further comprising:
computing a scale factor of the image of the structure irrespective of a type of camera used in capturing the image of a structure, wherein the scale factor allows conversion of the estimate of the first floor height expressed in pixels into real-world dimension units.

18. A non-transitory computer-readable storage medium storing instructions configured to cause at least one computing device to perform a method for automating estimation of a first floor height of an architectural structure comprising:
receiving an image of a structure;
segmenting the image of the structure to generate a segmented image comprising a plurality of physical layout elements identified from processing the image of the structure;
determining, using the segmented image of the structure, a first pixel location and a second pixel location corresponding respectively to a first floor position and a grade position of the structure; and
generating an estimate of a first floor height of the structure, based at least in part on a pixel height differential computed from the first pixel location and the second pixel location, wherein the estimate of the first floor height corresponds to a true, first-floor height of the structure.

19. The computer-readable storage medium of claim 18, wherein the estimate of the first floor height is expressed in pixels, the method further comprising:
based at least in part on data relating to a size of one or more physical layout elements included in the data relating to the plurality of physical layout elements identified from processing the image of the structure, computing a scaling ratio of the image of the structure; and applying the scaling ratio of the image of the structure to the estimate of the first floor height to convert the estimate of the first floor height expressed in pixels into real-world dimension units such that the estimate of the first floor height is applicable for real-world use.

20. The computer-readable storage medium of claim 18, wherein the data relating to the plurality of physical layout elements include data relating to at least one of: a doorway of the structure, a window of the structure, stairs in the structure, one or more garage doors associated with the structure, or extents of the structure defining outer edges of the structure.

\* \* \* \* \*

UNITED STATES PATENT AND TRADEMARK OFFICE
CERTIFICATE OF CORRECTION

| | | |
|---|---|---|
| PATENT NO. | : 11,532,093 B2 | Page 1 of 1 |
| APPLICATION NO. | : 17/068214 | |
| DATED | : December 20, 2022 | |
| INVENTOR(S) | : Victoria Mantey et al. | |

It is certified that error appears in the above-identified patent and that said Letters Patent is hereby corrected as shown below:

On the Title Page

On page 2, in Column 2, Item (56) under "U.S. Patent Documents", Line 39, delete "Zhan" and insert -- Zhang --.

In the Specification

In Column 10, Line 43, delete "a the" and insert -- the --.

Signed and Sealed this
Fifth Day of March, 2024

Katherine Kelly Vidal
*Director of the United States Patent and Trademark Office*